(12) United States Patent
Melman et al.

(10) Patent No.: US 7,636,356 B1
(45) Date of Patent: Dec. 22, 2009

(54) PROCESSOR TRAFFIC SEGREGATION FOR NETWORK SWITCHING AND ROUTING

(75) Inventors: David Melman, D.N. Bikat Beit Hakerem (IL); Nafea Bishara, San Jose, CA (US)

(73) Assignees: Marvell Israel (M.I.S.L.) Ltd, Yokneam (IL); Marvell International Ltd, Hamilton (BM)

( * ) Notice: Subject to any disclaimer, the term of this patent is extended or adjusted under 35 U.S.C. 154(b) by 577 days.

(21) Appl. No.: 11/324,597

(22) Filed: Jan. 3, 2006

(51) Int. Cl.
*H04L 12/28* (2006.01)
(52) U.S. Cl. .................................... 370/392
(58) Field of Classification Search ................ 370/230, 370/235, 351, 359, 360, 392, 393
See application file for complete search history.

(56) References Cited

U.S. PATENT DOCUMENTS

| | | | | |
|---|---|---|---|---|
| 5,550,816 A | * | 8/1996 | Hardwick et al. | 370/397 |
| 6,356,951 B1 | * | 3/2002 | Gentry, Jr. | 709/250 |
| 7,106,752 B2 | * | 9/2006 | Yamada | 370/412 |
| 7,298,707 B2 | * | 11/2007 | Retana et al. | 370/252 |
| 7,362,702 B2 | * | 4/2008 | Terrell et al. | 370/230 |
| 7,415,034 B2 | * | 8/2008 | Muller et al. | 370/463 |
| 2007/0058556 A1 | * | 3/2007 | Hilla et al. | 370/252 |

* cited by examiner

*Primary Examiner*—Derrick W Ferris
*Assistant Examiner*—Mohammad Anwar

(57) ABSTRACT

An apparatus having a corresponding method and computer program comprises network interfaces; a processor interface; a control circuit to remove the processor interface from associations between the interfaces and a domain; a classifier to assign codes to packets addressed to the processor interface, wherein the each code represents a protocol and comprises a flag; an allowance circuit to set the flag in the code for a packet when the packet comprises a protocol associated with the network interface that is the source of the packet, and to clear the flag otherwise; and an egress circuit to receive packets addressed to the processor interface, to drop the received packets having a code comprising a flag that is clear, and to transfer the received packets having a code comprising a flag that is set to the processor interface.

31 Claims, 5 Drawing Sheets

PROCESSOR TRAFFIC SEGREGATION FOR NETWORK SWITCHING AND ROUTING

BACKGROUND

The present invention relates generally to data communications. More particularly, the present invention relates to processor traffic segregation for network switching and routing.

In conventional managed network devices such as network switches and routers, the processor is generally accessed in the same manner as other ports in the device. While this approach has merit, it exposes the processor to denial-of-service (DoS) attacks, for example by flooding the processor with address resolution protocol (ARP) packets and the like so that the processor is too busy to handle routine user traffic. Such DoS generally require a technician to visit the afflicted network device to diagnose the problem, incurring substantial cost and delay in the process.

SUMMARY

In general, in one aspect, the invention features an apparatus comprising a plurality of network interfaces to exchange packets of data with a network; a processor interface to exchange at least some of the packets of data with a processor; a forwarding engine to transfer the packets of data among the interfaces; a memory to store first associations between the interfaces and at least one flooding domain; a control circuit to remove the processor interface from all of the first associations; a classifier to assign one of a plurality of processor codes to each packet of data received by one of the network interfaces and addressed to the processor interface, wherein the processor code assigned to each of the packets of data represents a protocol of the packet of data and comprises an allowance flag; wherein the memory stores second associations between the network interfaces and the protocols; an allowance circuit to set the allowance flag in the processor code assigned to each packet of data when the packet of data comprises a protocol associated with the network interface that is the source of the packet of data, and to clear the allowance flag otherwise; and a processor interface egress circuit to receive packets of data addressed to the processor interface, to drop the received packets of data having a processor code comprising an allowance flag that is clear, and to transfer the received packets of data having a processor code comprising an allowance flag that is set to the processor interface.

Some embodiments comprise the processor. In some embodiments, the memory stores third associations between each of the processor codes and one of a plurality of packet rates; and the processor interface egress circuit transfers each of the received packets of data having a processor code comprising an allowance flag that is set to the processor interface at the packet rate associated with the processor code of the packet of data. In some embodiments, the processor interface comprises a plurality of processor queues each associated with at least one of a plurality of priorities, and an arbiter; wherein the memory stores fourth associations between each of the processor codes and one of the priorities; wherein the processor interface egress circuit transfers each of the received packets of data having a processor code comprising an allowance flag that is set to the processor queue associated with the processor code of the packet of data; and wherein the arbiter transfers the packets of data from the processor queues to the processor. In some embodiments, the processor interface further exchanges at least some of the packets of data with at least one further processor; and wherein each of the processor codes further comprises an identity of one of the processor and the at least one further processor. Some embodiments comprise a network switch comprising the apparatus. Some embodiments comprise a network interface controller comprising the apparatus. Some embodiments comprise a network switch comprising the apparatus.

In general, in one aspect, the invention features an apparatus comprising a plurality of network interface means for exchanging packets of data with a network; processor interface means for exchanging at least some of the packets of data with a processor; forwarding engine means for transferring the packets of data among the interface means; memory means for storing first associations between the interface means and at least one flooding domain; control means for removing the processor interface means from all of the first associations; classifier means for assigning one of a plurality of processor codes to each packet of data received by one of the network interface means and addressed to the processor interface means, wherein the processor code assigned to each of the packets of data represents a protocol of the packet of data and comprises an allowance flag; wherein the memory means stores second associations between the network interface means and the protocols; allowance means for setting the allowance flag in the processor code assigned to each packet of data when the packet of data comprises a protocol associated with the network interface means that is the source of the packet of data, and to clear the allowance flag otherwise; and processor interface egress means for receiving packets of data addressed to the processor interface means, for dropping the received packets of data having a processor code comprising an allowance flag that is clear, and for transferring the received packets of data having a processor code comprising an allowance flag that is set to the processor interface means.

Some embodiments comprise the processor. In some embodiments, the memory stores third associations between each of the processor codes and one of a plurality of packet rates; and the processor interface egress means transfers each of the received packets of data having a processor code comprising an allowance flag that is set to the processor interface means at the packet rate associated with the processor code of the packet of data. In some embodiments, the processor interface means comprises a plurality of processor queue means each associated with at least one of a plurality of priorities, and means for arbiting; wherein the memory means stores fourth associations between each of the processor codes and one of the priorities; wherein the processor interface egress means transfers each of the received packets of data having a processor code comprising an allowance flag that is set to the processor queue means associated with the processor code of the packet of data; and wherein the means for arbiting transfers the packets of data from the processor queue means to the processor. In some embodiments, the processor interface means further exchanges at least some of the packets of data with at least one further processor; and wherein each of the processor codes further comprises an identity of one of the processor and the at least one further processor. Some embodiments comprise a network switch comprising the apparatus. Some embodiments comprise a network interface controller comprising the apparatus. Some embodiments comprise a network switch comprising the apparatus.

In general, in one aspect, the invention features a method for a network switch comprising a plurality of network interfaces to exchange packets of data with a network and a processor interface to exchange at least some of the packets of data with a processor, the method comprising storing first associations between the interfaces and at least one flooding domain; removing the processor interface from all of the first associations; assigning one of a plurality of processor codes to each packet of data received by one of the network interfaces and addressed to the processor interface, wherein the processor code assigned to each of the packets of data represents a protocol of the packet of data and comprises an allowance flag; storing second associations between the network interfaces and the protocols; and setting the allowance flag in the processor code assigned to each packet of data when the packet of data comprises a protocol associated with the network interface that is the source of the packet of data, and clearing the allowance flag otherwise; receiving packets of data addressed to the processor interface; dropping the received packets of data having a processor code comprising an allowance flag that is clear; and transferring the received packets of data having a processor code comprising an allowance flag that is set to the processor interface.

Some embodiments comprise storing third associations between each of the processor codes and one of a plurality of packet rates; and transferring each of the received packets of data having a processor code comprising an allowance flag that is set to the processor interface at the packet rate associated with the processor code of the packet of data. In some embodiments, the processor interface comprises a plurality of processor queues each associated with at least one of a plurality of priorities, the method further comprising storing fourth associations between each of the processor codes and one of the priorities; and transferring each of the received packets of data having a processor code comprising an allowance flag that is set to the processor queue associated with the processor code of the packet of data. In some embodiments, the processor interface further exchanges at least some of the packets of data with at least one further processor; and each of the processor codes further comprises an identity of one of the processor and the at least one further processor.

In general, in one aspect, the invention features a computer program for a network switch comprising a plurality of network interfaces to exchange packets of data with a network and a processor interface to exchange at least some of the packets of data with a processor, the computer program comprising storing first associations between the interfaces and at least one flooding domain; removing the processor interface from all of the first associations; assigning one of a plurality of processor codes to each packet of data received by one of the network interfaces and addressed to the processor interface, wherein the processor code assigned to each of the packets of data represents a protocol of the packet of data and comprises an allowance flag; storing second associations between the network interfaces and the protocols; and setting the allowance flag in the processor code assigned to each packet of data when the packet of data comprises a protocol associated with the network interface that is the source of the packet of data, and clearing the allowance flag otherwise; causing the network switch to receive packets of data addressed to the processor interface; causing the network switch to drop the received packets of data having a processor code comprising an allowance flag that is clear; and causing the network switch to transfer the received packets of data having a processor code comprising an allowance flag that is set to the processor interface.

Some embodiments comprise storing third associations between each of the processor codes and one of a plurality of packet rates; and causing the network switch to transfer each of the received packets of data having a processor code comprising an allowance flag that is set to the processor interface at the packet rate associated with the processor code of the packet of data. In some embodiments, the processor interface comprises a plurality of processor queues each associated with at least one of a plurality of priorities, the computer program further comprising storing fourth associations between each of the processor codes and one of the priorities; and causing the network switch to transfer each of the received packets of data having a processor code comprising an allowance flag that is set to the processor queue associated with the processor code of the packet of data. In some embodiments, the processor interface further exchanges at least some of the packets of data with at least one further processor; and wherein each of the processor codes further comprises an identity of one of the processor and the at least one further processor.

The details of one or more implementations are set forth in the accompanying drawings and the description below. Other features will be apparent from the description and drawings, and from the claims.

Figure 1:
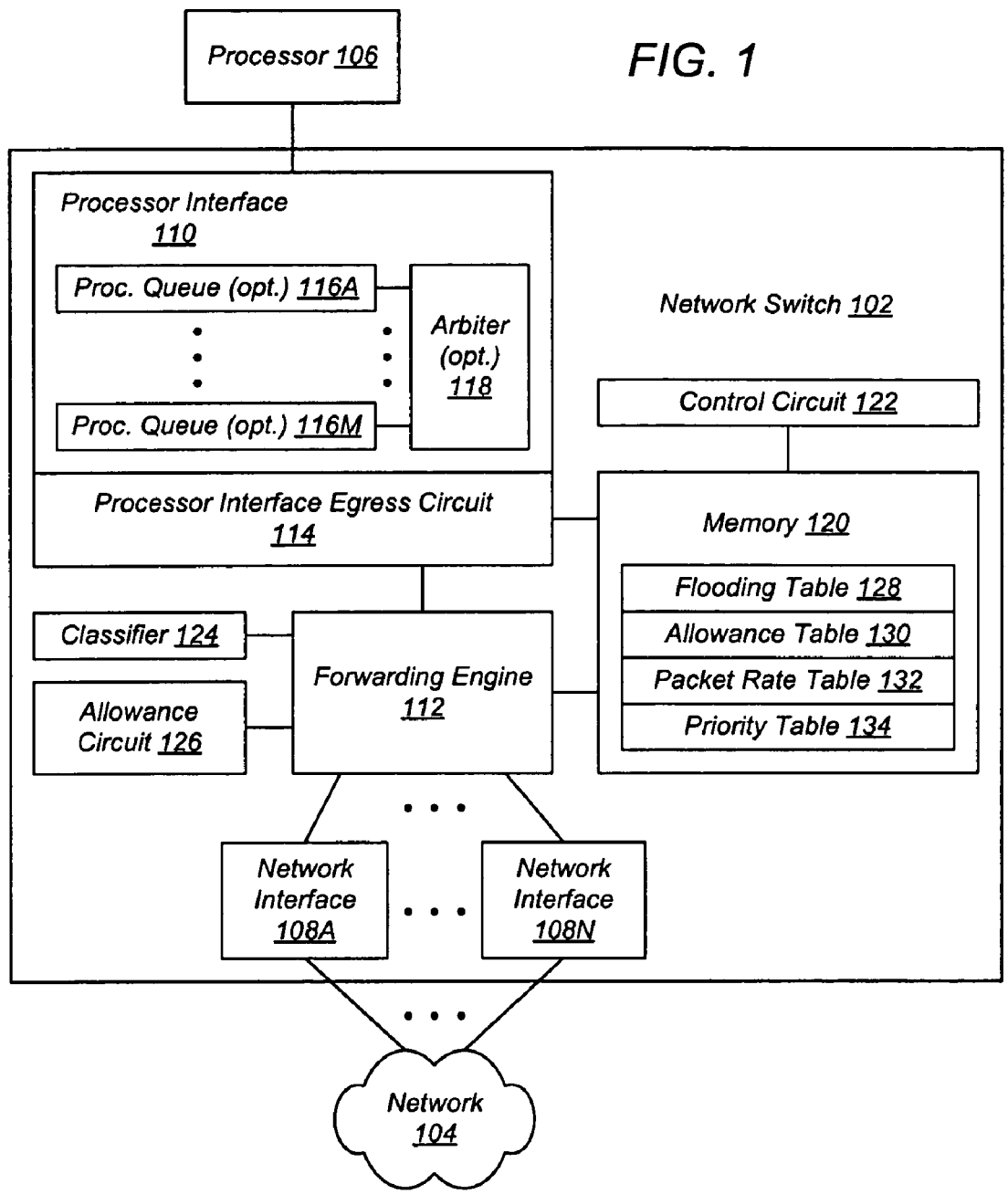
FIG. 1 shows a network switch in communication with a network and a processor according to a preferred embodiment of the present invention.

The leading digit(s) of each reference numeral used in this specification indicates the number of the drawing in which the reference numeral first appears.

DETAILED DESCRIPTION

Embodiments of the present invention provide apparatus such as network switches, routers, and the like that segregate traffic addressed to the processor of the device. In some embodiments, a control circuit removes the processor interface from all of the flood domains of the device. In some embodiments, only packets having certain protocols, and originating from certain source ports, are allowed to pass to the processor. Preferably the protocols are assigned on a per-port basis. In some embodiments, the rate at which packets are passed to the processor is limited. Preferably different packet rates can be selected for different protocols. In some embodiments, packets allowed to pass to the processor are queued in a plurality of queues according to priorities assigned to the protocols.

FIG. 1 shows a network switch 102 in communication with a network 104 and a processor 106 according to a preferred embodiment of the present invention. Preferably network switch 102 is a managed switch that is managed by processor 106. In some embodiments, network switch 102 comprises processor 106. While embodiments of the present invention are discussed in terms of network switch 102, other embodiments are implemented as other sorts of network devices, such as routers, network interface controllers, and the like.

Network switch 102 comprises a plurality of network interfaces 108A-N to exchange packets of data with network 104 and a processor interface 110 to exchange at least some of the packets of data with processor 106. Each interface preferably comprises one or more physical ports, as is well-known in the relevant arts. For example, each interface can be a port, a virtual local-area network (VLAN), or the like.

Network switch 102 further comprises a forwarding engine 112 to transfer the packets of data among interfaces 108, 110, and a processor interface egress circuit 114 to manage traffic addressed to processor 106. The term "traffic addressed to processor 106" is understood to include not only unicast traffic explicitly addressed to processor 106, but also any sort of traffic, such as multicast, broadcast, and the like, that is destined for processor 106.

Processor interface 110 optionally comprises a plurality of processor queues 116A-M to queue traffic to be delivered to processor 106 and an arbiter 118. Preferably each processor queue 116 queues traffic having a different priority, and arbiter 118 transfers the traffic from processor queues 116 to processor 106 according a predetermined priority scheme.

Network switch 102 further comprises a memory 120, a control circuit 122, a classifier 124, and an allowance circuit 126. The functions of these circuits are discussed in detail with reference to FIG. 2 below. Memory 120 stores a plurality of tables, as described in detail below.

Figure 2:
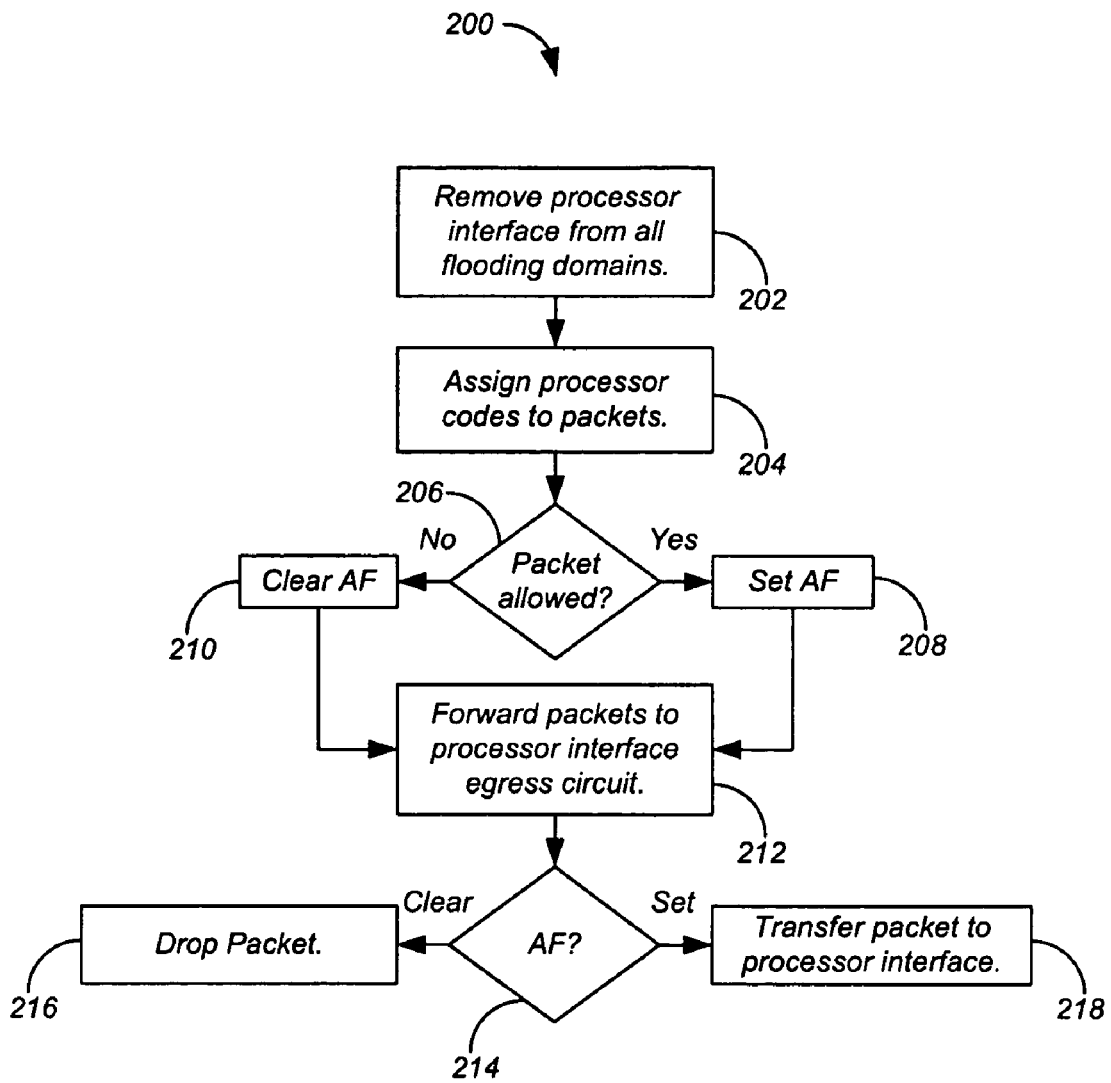
FIG. 2 shows a process for network switch according to a preferred embodiment of the present invention.

FIG. 2 shows a process 200 for network switch 102 according to a preferred embodiment of the present invention. Memory 120 stores a flooding table 128 comprising associations between interfaces 108, 110 and at least one flooding domain, for example such as a broadcast domain, a VLAN, and the like. Control circuit 122 removes processor interface 110 from all of the associations in flooding table 128 (step 202), thereby segregating processor traffic from other traffic.

Figure 3:
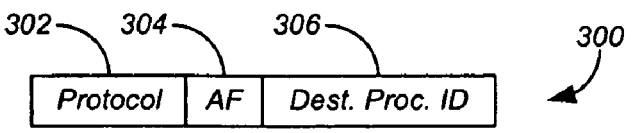
FIG. 3 shows a format of the processor code according to a preferred embodiment of the present invention.

Classifier 124 examines each packet of data received by a network interface 108 and addressed to the processor interface, and assigns a processor code to each of the packets (step 204). FIG. 3 shows a format of the processor code 300 according to a preferred embodiment of the present invention. Each processor code 300 comprises a protocol field 302 that represents a protocol of the packet of data and an allowance flag (AF) 304 that indicates whether the packet is allowed to be transferred to processor interface 110, and subsequently to processor 106. Preferably each processor code 300 is inserted into the respective packet.

Memory 120 also stores an allowance table 130 comprising allowed associations between network interfaces 108 and the protocols. Allowance circuit 126 sets the allowance flag 304 in the processor code 300 assigned to a packet of data when the packet of data comprises a protocol associated with the network interface 108 that is the source of the packet of data, and clears allowance flag 304 otherwise.

In particular, allowance circuit 126 examines allowance table 130 for each packet of data to determine whether an entry exists in allowance table 130 that associates the source network interface 108 of the packet (that is, the network interface 108 that received the packet into network switch 102) with the protocol of the packet (step 206). If such an entry exists, allowance circuit 126 sets the allowance flag 304 in the processor code 300 assigned to the packet (step 208). Otherwise, allowance circuit 126 clears the allowance flag 304 in the packet (step 210).

Forwarding engine 112 forwards the packets addressed to processor 106 to processor interface egress circuit 114 (step 212), which receives each packet and examines the allowance flag 304 in the corresponding processor code 300 (step 214).

If allowance flag 304 is clear, processor interface egress circuit 114 drops the packet (step 216). But if allowance flag 304 is set, processor interface egress circuit 114 transfers the corresponding packet to processor interface 110 (step 218).

In some embodiments, network switch 102 limits the packet rates (that is, the number of packets per unit of time) of packets transferred to processor 106.

Preferably different packet rates can be assigned to each processor code 300. The packet rates can be set to prevent denial-of-service attacks based on floods to processor 106. For example, if it is known that only 20 computers can communicate with processor 106, and that each computer can transmit at most one ARP packet per second, then the packet rate for ARP packets can be limited to at most 20 ARP packets per second. Preferably burstiness support is included to facilitate special events such as network setup.

According to these embodiments, memory 120 also stores a packet rate table 132 comprising associations between each processor code 300 and one of a plurality of packet rates. Processor interface egress circuit 114 transfers each of the received packets of data having a processor code 300 comprising an allowance flag 304 that is set to processor interface 110 at the packet rate associated with the processor code 300 of the packet of data by packet rate table 132.

In some embodiments, processor interface 110 comprises a plurality of processor queues 116, each associated with at least one of a plurality of priorities, and an arbiter 118. Processor queues 116 can be used, for example, to implement quality of service (QoS) for packets to be transferred to processor 106. According to these embodiments, memory 120 stores a priority table 134 comprising associations between each processor code 300 and one of the priorities. Processor interface egress circuit 114 transfers each of the received packets of data having a processor code 300 comprising an allowance flag 304 that is set to the processor queue 116 associated with the processor code 300 of the packet of data by priority table 134. Arbiter 118 subsequently transfers the packets from processor queues 116 to processor 106 according to a predetermined priority scheme.

Some embodiments comprise more than one processor 106. According to these embodiments, processor code 300 also comprises a destination processor identifier (ID) 306. Processor interface 110 uses the destination processor IDs 306 to transfer the packets of data from processor queues 116 to the correct processor 106.

Figure 4A:
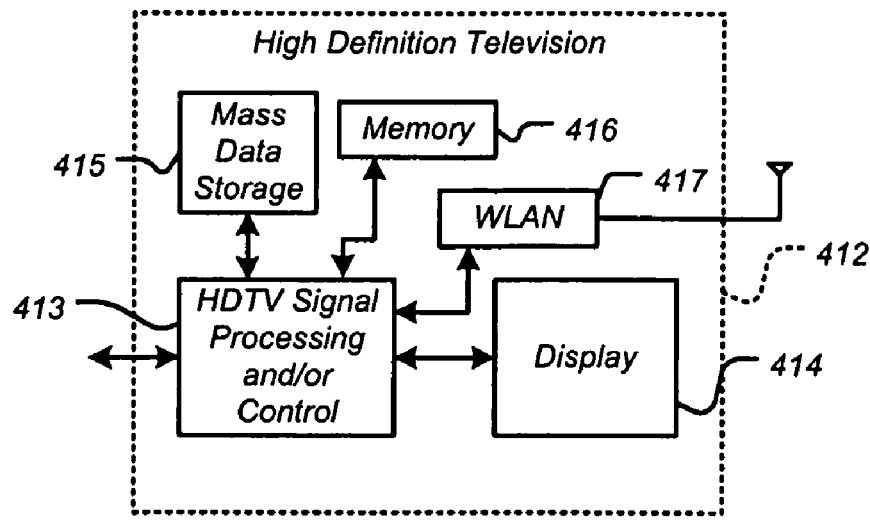
Referring now to FIGS. 4A-4E, various exemplary implementations of the present invention are shown.

Referring now to FIGS. 4A-4E, various exemplary implementations of the present invention are shown. Referring now to FIG. 4A, the present invention can be implemented in a high definition television (HDTV) 412. The present invention may implement either or both signal processing and/or control circuits, which are generally identified in FIG. 4A at 413, a WLAN interface and/or mass data storage of the HDTV 412. The HDTV 412 receives HDTV input signals in either a wired or wireless format and generates HDTV output signals for a display 414. In some implementations, signal processing circuit and/or control circuit 413 and/or other circuits (not shown) of the HDTV 412 may process data, perform coding and/or encryption, perform calculations, format data and/or perform any other type of HDTV processing that may be required.

The HDTV 412 may communicate with mass data storage 415 that stores data in a nonvolatile manner such as optical and/or magnetic storage devices. The HDD may be a mini HDD that includes one or more platters having a diameter that is smaller than approximately 1.8". The HDTV 412 may be connected to memory 416 such as RAM, ROM, low latency nonvolatile memory such as flash memory and/or other suitable electronic data storage. The HDTV 412 also may support connections with a WLAN via a WLAN network interface 417.

Figure 4B:
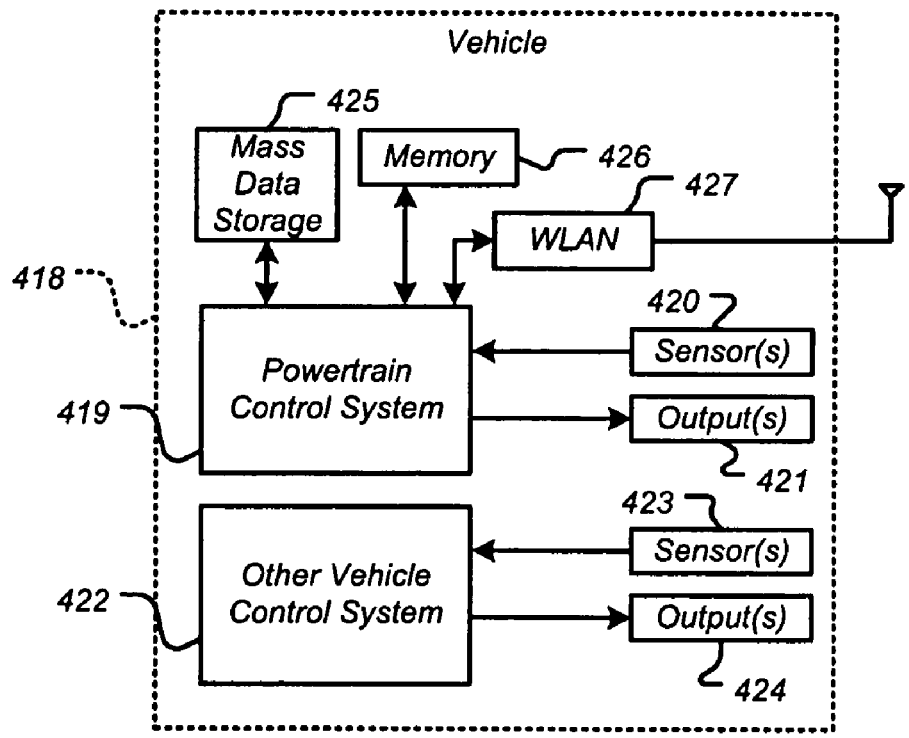

Referring now to FIG. 4B, the present invention implements a control system of a vehicle 418, a WLAN interface and/or mass data storage of the vehicle control system. In some implementations, the present invention implements a powertrain control system 419 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 422 of the vehicle 418. The control system 422 may likewise receive signals from input sensors 423 and/or output control signals to one or more output devices 424. In some implementations, the control system 422 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 419 may communicate with mass data storage 425 that stores data in a nonvolatile manner. The mass data storage 425 may include optical and/or magnetic storage devices for example hard disk drives HDD and/or DVDs. The HDD may be a mini HDD that includes one or more platters having a diameter that is smaller than approximately 1.8"The powertrain control system 419 may be connected to memory 426 such as RAM, ROM, low latency nonvolatile memory such as flash memory and/or other suitable electronic data storage. The powertrain control system 419 also may support connections with a WLAN via a WLAN network interface 427. The control system 422 may also include mass data storage, memory and/or a WLAN interface (all not shown).

Figure 4C:
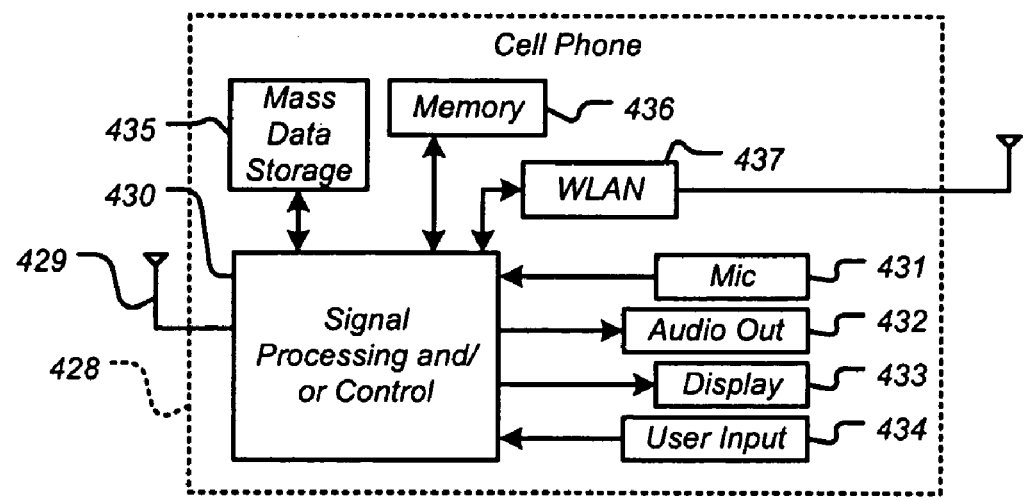

Referring now to FIG. 4C, the present invention can be implemented in a cellular phone 428 that may include a cellular antenna 429. The present invention may implement either or both signal processing and/or control circuits, which are generally identified in FIG. 4C at 430, a WLAN interface and/or mass data storage of the cellular phone 428. In some implementations, the cellular phone 428 includes a microphone 431, an audio output 432 such as a speaker and/or audio output jack, a display 433 and/or an input device 434 such as a keypad, pointing device, voice actuation and/or other input device. The signal processing and/or control circuits 430 and/or other circuits (not shown) in the cellular phone 428 may process data, perform coding and/or encryption, perform calculations, format data and/or perform other cellular phone functions.

The cellular phone 428 may communicate with mass data storage 435 that stores data in a nonvolatile manner such as optical and/or magnetic storage devices for example hard disk drives HDD and/or DVDs. The HDD may be a mini HDD that includes one or more platters having a diameter that is smaller than approximately 1.8"The cellular phone 428 may be connected to memory 436 such as RAM, ROM, low latency nonvolatile memory such as flash memory and/or other suitable electronic data storage. The cellular phone 428 also may support connections with a WLAN via a WLAN network interface 437.

Figure 4D:
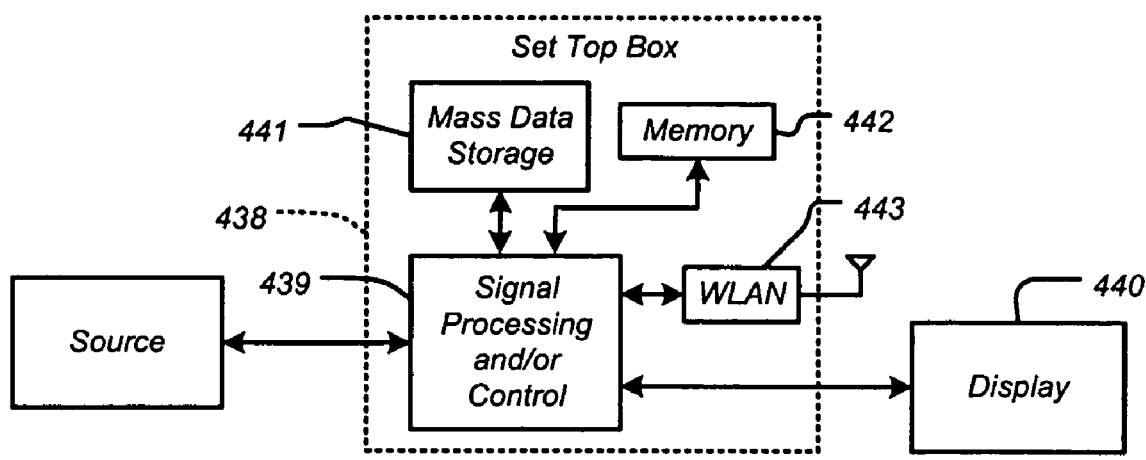

Referring now to FIG. 4D, the present invention can be implemented in a set top box 438. The present invention may implement either or both signal processing and/or control circuits, which are generally identified in FIG. 4D at 439, a WLAN interface and/or mass data storage of the set top box 438. The set top box 438 receives signals from a source such as a broadband source and outputs standard and/or high definition audio/video signals suitable for a display 440 such as a television and/or monitor and/or other video and/or audio output devices. The signal processing and/or control circuits 439 and/or other circuits (not shown) of the set top box 438 may process data, perform coding and/or encryption, perform calculations, format data and/or perform any other set top box function.

The set top box 438 may communicate with mass data storage 443 that stores data in a nonvolatile manner. The mass data storage 443 may include optical and/or magnetic storage devices for example hard disk drives HDD and/or DVDs. The HDD may be a mini HDD that includes one or more platters having a diameter that is smaller than approximately 1.8"The set top box 438 may be connected to memory 442 such as RAM, ROM, low latency nonvolatile memory such as flash memory and/or other suitable electronic data storage. The set top box 438 also may support connections with a WLAN via a WLAN network interface 443.

Figure 4E:
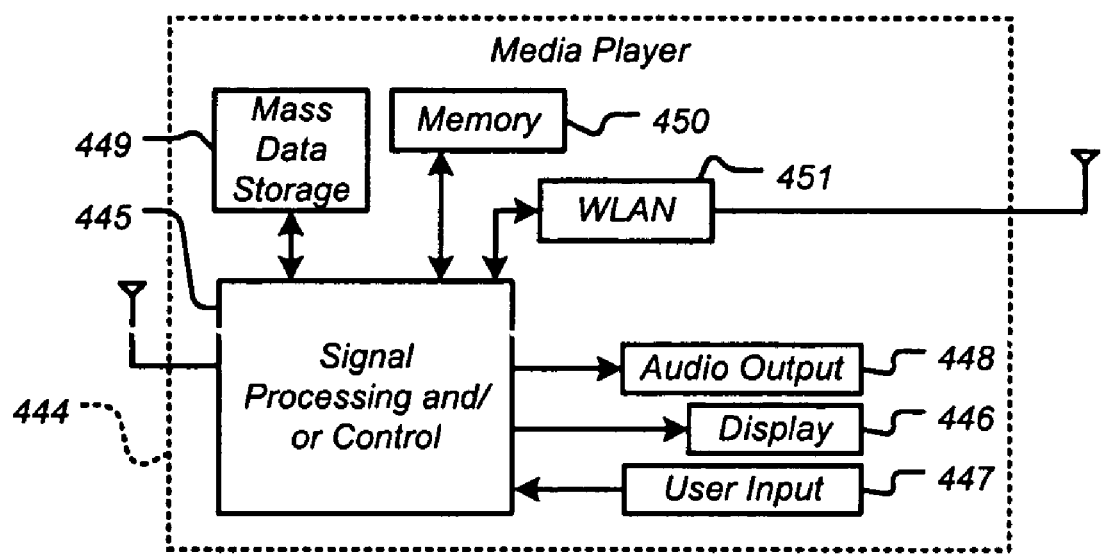

Referring now to FIG. 4E, the present invention can be implemented in a media player 444. The present invention may implement either or both signal processing and/or control circuits, which are generally identified in FIG. 4E at 445, a WLAN interface and/or mass data storage of the media player 444. In some implementations, the media player 444 includes a display 446 and/or a user input 447 such as a keypad, touchpad and the like. In some implementations, the media player 444 may employ a graphical user interface (GUI) that typically employs menus, drop down menus, icons and/or a point-and-click interface via the display 446 and/or user input 447. The media player 444 further includes an audio output 448 such as a speaker and/or audio output jack. The signal processing and/or control circuits 445 and/or other circuits (not shown) of the media player 444 may process data, perform coding and/or encryption, perform calculations, format data and/or perform any other media player function.

The media player 444 may communicate with mass data storage 449 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8"The media player 444 may be connected to memory 450 such as RAM, ROM, low latency nonvolatile memory such as flash memory and/or other suitable electronic data storage. The media player 444 also may support connections with a WLAN via a WLAN network interface 451. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
 a plurality of network interfaces to exchange packets of data with a network;
 a processor interface to exchange at least some of the packets of data with a processor;
 a forwarding engine to transfer the packets of data among the interfaces;
 a memory to store first associations between the interfaces and at least one flooding domain;
 a control circuit to remove the processor interface from all of the first associations;
 a classifier to assign one of a plurality of processor codes to each of the packets of data received by one of the network interfaces and addressed to the processor interface, wherein the processor code assigned to each of the packets of data represents a protocol of the packet of data and comprises an allowance flag;
 wherein the memory stores second associations between the network interfaces and the protocols;
 an allowance circuit to set the allowance flag in the processor code assigned to each of the packets of data when the packet of data comprises the protocol associated with the network interface that is the source of the packet of data, and to clear the allowance flag otherwise; and
 a processor interface egress circuit to receive packets of data addressed to the processor interface, to drop the received packets of data having a first of the processor codes comprising the allowance flag that is clear, and to transfer the received packets of data having a second of the processor codes comprising the allowance flag that is set to the processor interface.

2. The apparatus of claim 1, further comprising:
 the processor.

3. The apparatus of claim 1:
 wherein the memory stores third associations between each of the processor codes and one of a plurality of packet rates; and
 wherein the processor interface egress circuit transfers each of the received packets of data having a third of the processor codes comprising the allowance flag that is set to the processor interface at the packet rate associated with the processor code of the packet of data.

4. The apparatus of claim 3:
 wherein the processor interface comprises
  a plurality of processor queues each associated with at least one of a plurality of priorities, and
  an arbiter;
 wherein the memory stores fourth associations between each of the processor codes and one of the priorities;
 wherein the processor interface egress circuit transfers each of the received packets of data having a fourth of the processor codes comprising the allowance flag that is set to the processor queue associated with the processor code of the packet of data; and
 wherein the arbiter transfers the packets of data from the processor queues to the processor.

5. The apparatus of claim 4:
 wherein the processor interface further exchanges at least some of the packets of data with at least one further processor; and
 wherein each of the processor codes further comprises an identify of one of the processor and the at least one further processor.

6. A network switch comprising the apparatus of claim 1.

7. A router comprising the apparatus of claim 1.

8. A network interface controller comprising the apparatus of claim 1.

9. An apparatus comprising:
 a plurality of network interface means for exchanging packets of data with a network;
 processor interface means for exchanging at least some of the packets of data with a processor;
 forwarding engine means for transferring the packets of data among the interface means;
 memory means for storing first associations between the interface means and at least one flooding domain;
 control means for removing the processor interface means from all of the first associations;
 classifier means for assigning one of a plurality of processor codes to each of the packets of data received by one of the network interface means and addressed to the processor interface means, wherein the processor code assigned to each of the packets of data represents a protocol of the packet of data and comprises an allowance flag;
 wherein the memory means stores second associations between the network interface means and the protocols;
 allowance means for setting the allowance flag in the processor code assigned to each of the packets of data when the packet of data comprises the protocol associated with the network interface means that is the source of the packet of data, and to clear the allowance flag otherwise; and
 processor interface egress means for receiving packets of data addressed to the processor interface means, for dropping the received packets of data having a first of the processor codes comprising the allowance flag that is clear, and for transferring the received packets of data having a second of the processor codes comprising the allowance flag that is set to the processor interface means.

10. The apparatus of claim 9, further comprising:
 the processor.

11. The apparatus of claim 9:
 wherein the memory stores third associations between each of the processor codes and one of a plurality of packet rates; and
 wherein the processor interface egress means transfers each of the received packets of data having a third of the processor codes comprising the allowance flag that is set to the processor interface means at the packet rate associated with the processor code of the packet of data.

12. The apparatus of claim 11:
 wherein the processor interface means comprises
  a plurality of processor queue means each associated with at least one of a plurality of priorities, and means for arbiting;
wherein the memory means stores fourth associations between each of the processor codes and one of the priorities;
wherein the processor interface egress means transfers each of the received packets of data having a fourth of the processor codes comprising the allowance flag that is set to the processor queue means associated with the processor code of the packet of data; and
wherein the means for arbiting transfers the packets of data from the processor queue means to the processor.

13. The apparatus of claim 12:
wherein the processor interface means further exchanges at least some of the packets of data with at least one further processor; and
wherein each of the processor codes further comprises an identity of one of the processor and the at least one further processor.

14. A network switch comprising the apparatus of claim 9.

15. A router comprising the apparatus of claim 9.

16. A network interface controller comprising the apparatus of claim 9.

17. A method for a network switch comprising a plurality of network interfaces to exchange packets of data with a network and a processor interface to exchange at least some of the packets of data with a processor, the method comprising:
storing first associations between the interfaces and at least one flooding domain;
removing the processor interface from all of the first associations;
assigning one of a plurality of processor codes to each of the packets of data received by one of the network interfaces and addressed to the processor interface, wherein the processor code assigned to each of the packets of data represents a protocol of the packet of data and comprises an allowance flag;
storing second associations between the network interfaces and the protocols; and
setting the allowance flag in the processor code assigned to each of the packets of data when the packet of data comprises the protocol associated with the network interface that is the source of the packet of data, and clearing the allowance flag otherwise;
receiving packets of data addressed to the processor interface;
dropping the received packets of data having a first of the processor codes comprising the allowance flag that is clear; and
transferring the receiving packets of data having a second of the processor codes comprising the allowance flag that is set to the processor interface.

18. The method of claim 17, further comprising:
storing third associations between each of the processor codes and one of a plurality of packet rates; and
transferring each of the received packets of data having a third of the processor codes comprising the allowance flag that is set to the processor interface at the packet rate associated with the processor code of the packet of data.

19. The method of claim 18, wherein the processor interface comprises a plurality of processor queues each associated with at least one of a plurality of priorities, the method further comprising:
storing fourth associations between each of the processor codes and one of the priorities; and
transferring each of the received packets of data having a fourth of the processor codes comprising the allowance flag that is set to the processor queue associated with the processor code of the packet of data.

20. The method of claim 19:
wherein the processor interface further exchanges at least some of the packets of data with at least one further processor; and
wherein each of the processor codes further comprises an identity of one of the processor and the at least one further processor.

21. A computer program stored on a computer readable medium and executable by a computer of a network switch comprising a plurality of network interfaces to exchange packets of data with a network and a processor interface to exchange at least some of the packets of data with a processor, the computer program comprising:
storing first associations between the interfaces and at least one flooding domain;
removing the processor interface from all of the first associations;
assigning one of a plurality of processor codes to each of the packets of data received by one of the network interfaces and addressed to the processor interface, wherein the processor code assigned to each of the packets of data represents a protocol of the packet of data and comprises an allowance flag;
storing second associations between the network interfaces and the protocols; and
setting the allowance flag in the processor code assigned to each of the packets of data when the packet of data comprises the protocol associated with the network interface that is the source of the packet of data, and clearing the allowance flag otherwise;
causing the network switch to receive packets of data addressed to the processor interface;
causing the network switch to drop the receiving packets of data having a first of the processor codes comprising the allowance flag that is clear; and
causing the network switch to transfer the received packets of data having a second of the processor codes comprising the allowance flag that is set to the processor interface.

22. The computer program of claim 21, further comprising:
storing third associations between each of the processor codes and one of a plurality of packet rates; and
causing the network switch to transfer each of the received packets of data having a third of the processor codes comprising the allowance flag that is set to the processor interface at the packet rate associated with the processor code of the packet of data.

23. The computer program of claim 22, wherein the processor interface comprises a plurality of processor queues each associated with at least one of a plurality of priorities, the computer program further comprising:
storing fourth associations between each of the processor codes and one of the priorities; and
causing the network switch to transfer each of the received packets of data having a fourth of the processor codes comprising the allowance flag that is set to the processor queue associated with the processor code of the packet of data.

24. The computer program of claim 23:
wherein the processor interface further exchanges at least some of the packets of data with at least one further processor; and
wherein each of the processor codes further comprises an identity of one of the processor and the at least one further processor.

25. An apparatus comprising:
- a plurality of network interfaces to exchange packets with a network;
- a processor interface to exchange the packets with a processor;
- a classifier to assign a processor code of the processor to one of the packets received by one of the network interfaces and addressed to the processor interface, wherein the processor code represents a protocol of the one of the packets and includes an allowance flag; and
- an allowance circuit to selectively set the allowance flag in the processor code for the one of the packets when the protocol is also used by the network interface that is the source of the packet, and to clear the allowance flag otherwise.

26. The apparatus of claim 25 further comprising a processor interface egress circuit to receive packets addressed to the processor interface, to drop the received packets if the allowance flag is clear in the processor code, and to transfer the received packets if the allowance flag is set to the processor interface.

27. The apparatus of claim 25 further comprising a control circuit to remove data for the processor interface from stored first associations between the network interfaces and a flooding domain of the network.

28. The apparatus of claim 27, wherein the processor interface comprises:
- a plurality of processor queues each associated with at least one of a plurality of priorities, and
- an arbiter, wherein memory stores second associations between each of the processor codes and one of the priorities,
- wherein the processor interface egress circuit transfers each of the received packets having the processor codes where the allowance flag is set to the processor queue associated with the processor code of the packet, and
- wherein the arbiter transfers the packets from the processor queues to the processor.

29. The apparatus of claim 28 further comprising memory that stores the second associations between the network interfaces and the protocols after storing the first associations.

30. The apparatus of claim 29 wherein the allowance circuit analyzes the second associations and selectively sets the allowance flag based on analysis of the first associations and the second associations.

31. The apparatus of claim 25 further comprising a forwarding engine to transfer the packets of data among the interfaces.

* * * * *